Sept. 9, 1969  FUMIO SAEKI  3,465,917
METHOD FOR THE PRODUCTION OF PLASTIC TUBES
Filed March 31, 1967  2 Sheets-Sheet 2
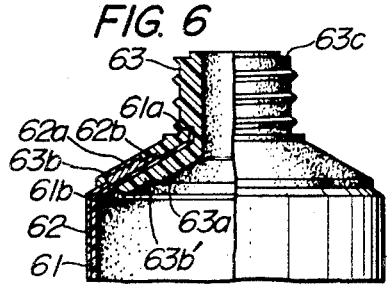
FIG. 6
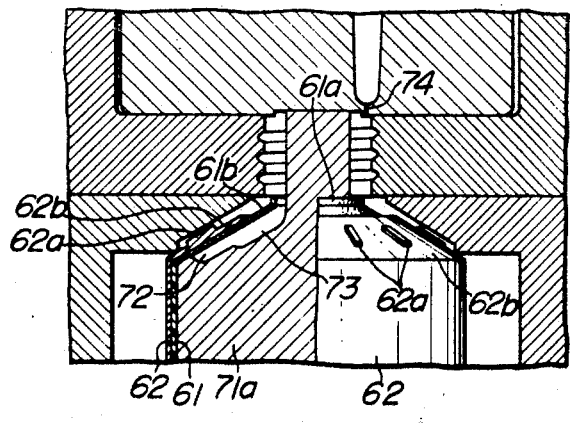
FIG. 7
FIG. 8
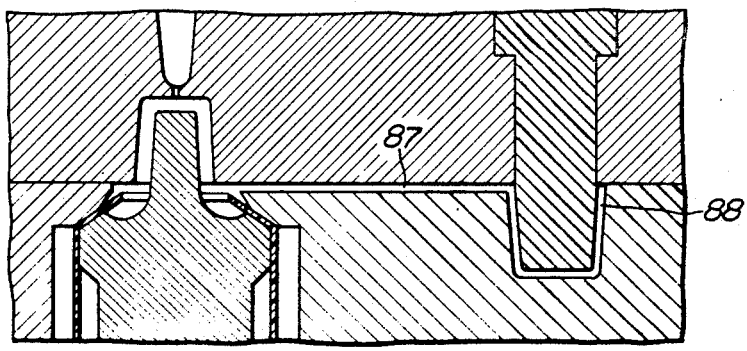
INVENTOR
Fumio Saeki
BY Cushman, Darby r Cushman
ATTORNEYS United States Patent Office 3,465,917
Patented Sept. 9, 1969

3,465,917
METHOD FOR THE PRODUCTION OF PLASTIC TUBES
Fumio Saeki, Osaka, Japan, assignor to Taisei Kako Kabushiki Kaisha, Osaka, Japan, a corporation of Japan
Filed Mar. 31, 1967, Ser. No. 627,414
Claims priority application Japan, June 29, 1966, 41/42,553; Dec. 3, 1966 (utility model), 41/110,774
Int. Cl. B65d *35/14;* B29d *3/00, 23/02*
U.S. Cl. 222—107                                17 Claims

ABSTRACT OF THE DISCLOSURE

A plastic tube consisting of a tubular body section and a lid section formed on one end of said tubular body section by injection molding with the edge portion of that end of the tubular body embedded therein and rigidly connected thereto by melt bonding.

Background of the invention

Plastic tubes made by blow molding have been used for practical applications for long. These tubes are superior to metallic tubes in respect of resistance against corrosion and deformation but, on the other hand, there is the drawback that they cannot be produced with an opening of a small diameter nor can they be produced with high flatness at the top surface of the opening. Another drawback of the plastic tubes of the type described is that, since the wall thickness of the lid section is substantially equal to that of the parison and therefore the wall thickness of the tubular body section is automatically determined by the wall thickness of the parison as well as by the ratio of the diameter of the parison to that of the tubular body section, a tube having a wall thickness of the body section so thin as to facilitate the use thereof will have a wall thickness of the lid section so thin as not to withstand the tightening force of a cap causing deformation of said lid section. Such a thin wall thickness of the lid section, together with the lack of flatness at the top surface of the opening as described above, often result in loose or incomplete closure of the opening, precipitating deterioration or leakage of an article contained in the tube. In this case, although the lack of flatness at the top surface of the opening may be overcome by employing injection blow method, it is impossible to optionally control the ratio of the wall thickness of the lid section to that of the body section.

Summary of the invention

The present invention relates generally to a plastic tube and more particularly to a novel tube which is produced by a combination of a tubular body and a lid portion preparedly an injection molding, and also a method for the production thereof.

An object of this invention is to provide a novel plastic tube wherein the diameter and wall thickness of a lid section may be determined independently of the diameter and wall thickness of a tubular body section of the tube, and a method of producing the same on an industrial scale.

Another object of this invention is to provide a composite plastic tube having the merits of both of metallic tube and plastic tube.

Still another object of this invention is to provide on a commercial basis a cap-attached-plastic tube, wherein a cap is attached directly to the tube.

These and other objects, features and advantages of the present invention will become apparent to those skilled in the art from the following description.

In order to overcome the aforementioned drawbacks of the plastic tubes obtained by blow molding, there has already been developed a combined tube wherein a plastic tubular body section formed by inflation method and a lid section (consisting integrally of a tubular head and a frustoconical shoulder) formed by injection molding are adhesively combined together. Such a combined tube is advantageous in that the diameter and wall thickness of the lid section can be controlled freely and that the top surface of the tubular head may be formed with high accuracy, as a result of employing injection molding for the formation of the lid section. This type of tubes, however, still has the drawback that the wall thickness of the shoulder is objectionably large.

The present invention contemplates to provide a novel tube which is free from the foregoing drawback of the known combined tube, and a method of producing the same. In order that the present invention may be more clearly understood, reference may now be had to the accompanying drawings in which the present invention is illustrated by way of example, and in which:

Brief description of the drawing

FIGS. 4 to 6 are respective side elevations, partially broken away, of other embodiments of the inventive tube;

FIG. 7 is a vertical cross section showing the essential portion of a metal mold used in the production of the tube shown in FIG. 6; and FIG. 8 is a vertical cross section showing the essential portion of another metal mold used for practicing the present invention.

Description of the preferred embodiments

Figure 1:
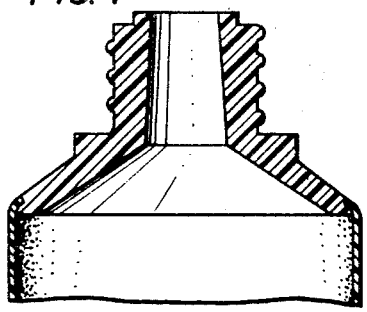
FIG. 1 is a vertical cross section of the lid section of a conventional plastic tube formed by inflation method.

Describing the conventional combined tube first in further detail with reference to FIG. 1, the top edge of a tubular body, which composes the body section of the tube, is slightly flexed inwardly to fit on an annular notch formed in the lower peripheral edge of the frustoconical shoulder of the lid section. It will be appreciated, therefore, that the shoulder of the lid section must have a wall thickness at least twice as large as that of the tubular body. Such a large wall thickness of the shoulder is apparently detrimental to satisfactorily squeeze an article in the tube. In particular, it is impossible to squeeze that portion of the article from the tube which is remaining in a portion of the tube interior and above the shoulder. Furthermore, the tube of this type is generally not suitable for the production in a small quantity and yet the production process of the same requires at least three steps.

Figure 2:
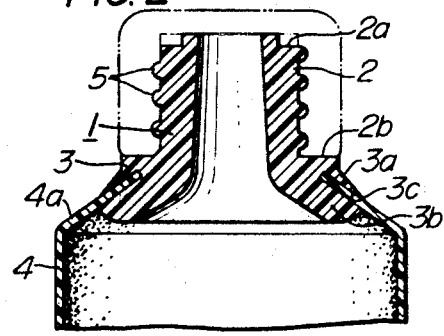
FIG. 2 is a side elevation, partially shown in section, of the essential portion of the inventive tube.

According to an embodiment of the present invention shown in FIG. 2, a lid section 1 formed of a thermoplastic resin consists of a head 2 having an external thread 5 on the outer periphery thereof and a shoulder 3 flaring successively downwardly of said head. The shoulder 3 has a double-wall structure consisting of an outer wall 3*a* and an inner wall 3*b*, which are separated by a groove 3*c* formed in said shoulder from the lower edge along the entire periphery thereof. A tubular body section 4 consists of a thin-walled tube having both ends open, which is formed of a material of the same quality as that of the resin of which the lid section 2 is formed, by blow molding. The body section 4 is characterized by a distinct shoulder 4*a* formed at the top edge thereof. The upper portion of the shoulder 4*a* is fitted in the groove 3*c* and is melt bonded rigidly to the confronting surface of the outer and inner wall of the shoulder 3.

In use of the inventive tube described above, a cap shown by the chain line in the figure is removed at first and then an article in the tube is squeezed out therefrom by applying a pressure from the lower portion towards the upper portion of the body section as in the case of conventional tubes.

The inventive tube illustrated hereinabove has the following advantages. Firstly, the thin wall thickness of the body section, including the shoulder, not only eases the squeezing operation of the article in the tube but also enables the article to be squeezed substantially exhaustedly. Secondly, the connection between the body section and the lid section is extremely rigid as the former is fitted in and fastly connected to the latter by melt bonding. Because of such structure, there is no fear of the joint being cracked even when the tube is handled roughly. The foregoing features afford the inventive tube great practical advantage.

The tube according to the present invention may be produced with any thermoplastic resin which is presently available or will be made available in the future. The type of resin to be used may be selected based primarily on the characteristics of an article to be contained in the tube. In this case, it is to be noted that the resins to be used for the formation of the body section and the lid section are not necessarily the same but any resins adhesive to each other may be used. The term "same quality" as used herein should, therefore, be understood in this sense.

Figure 4:
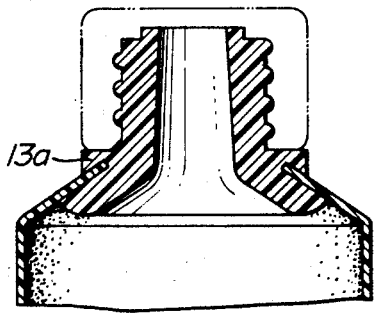
Figure 5:
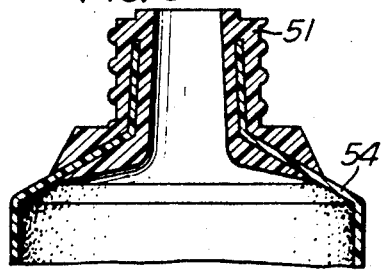

The inventive tube may be modified in many ways without departing from the scope of the invention as defined in the appended claims. Modified forms of the inventive tube are shown in FIGS. 4 to 6 in a side elevation respectively with a portion broken away. FIG. 4 shows a modification of the tube shown in FIG. 2, wherein it will be seen that the outer wall 13a is shortened in the way shown. The function and effect of this tube are of course the same as those of the tube shown in FIG. 2. In FIG. 5, there is shown another form of the tube wherein a tubular body having an elongate head is used for the body section of the tube. In this form of tube, the connection between the body section 54 and the lid section 51 of the tube is much more rigid than that in the case of the tube shown in FIG. 2, because of the greater contact area therebetween.

FIG. 6 shows a tube wherein the body section is composed of a plastic-made inner tube and a plastic metal-made outer tube superposed thereon and a lid section is formed on the body section in connection therewith by means of injection molding. As is seen, the inner tube 61 has a very short head 61a. The head 63 of the tube has a double-walled shoulder consisting of an inner wall 63b', which is in contact with the inner surfaces of the head 61a and the successive shoulder 61b of the inner tube, and an outer wall 63b which is overlying the outer surface of the shoulder 62b of the metallic outer tube 62 enclosing the inner tube 61 including the shoulder 61b, said inner and outer walls being formed integrally of a synthetic resin of the same quality as that of the resin of which the inner tube 61 is formed. On the outer surface of the shoulder 62b of the outer tube 62 are formed a plurality of ridges 62a which are arranged radially with respect to the axis of the tube and which serve to prevent a relative sliding movement between the outer tube and the shoulder of the lid section of the tube. Similarly, a plurality of integral ridges 63a are formed on the inner surface of the inner wall 63b', which are extending radially of the axis of the tube and which serve to reinforce the inner wall 63b' as well as to facilitate formation of said inner wall during molding process. The tube of this embodiment possesses the merits of both metallic tube and plastic tube. In addition, torsion of the inner tube possibly caused during engagement of a cap with the tube can be prevented completely, which has been regarded as one of the drawbacks of the composite tube of this type. This is possible because the shoulders of the inner and outer tubes are tightly held between the outer and inner walls 63b and 63b', so that there is no possibility of the connection between the lid section and the body section of the tube being loosened upon engagement of the cap. Either form of the inventive tube described hereinabove may be produced industrially by molding the lid section on top of the open-bottomed tubular body section by injection molding and connecting it thereto by melt bonding, which body section has been previously formed by such means as of blow molding. By employing this method, the production process of the tube is basically reduced to two steps and additionally the formation of the top end surface of the lid section can be controlled in a precise manner. In other words, the advantageous features of the injection molding can be enjoyed to the fullest extent. Furthermore, complete melt bonding of the lid section to the body section is possible by making the use of the latent heat of the molten resin injected. The use of blow molding method for the formation of the body section obviously provides for free selection of configuration for said body section as well as pattern to be formed thereon.

Figure 3:
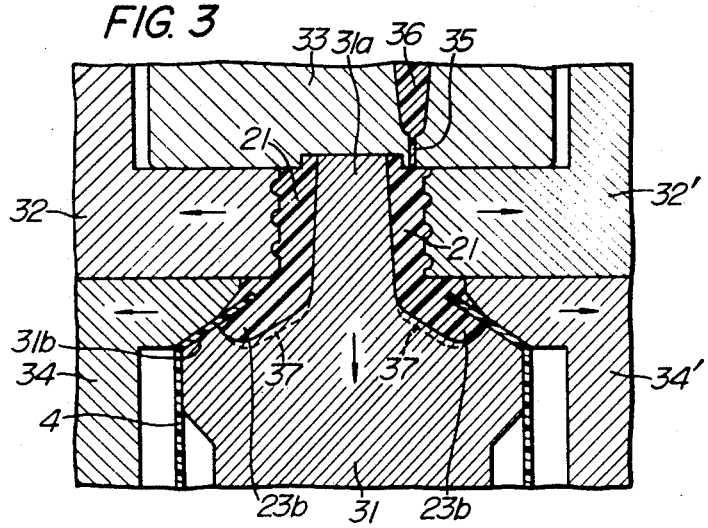
FIG. 3 is a vertical cross section showing the essential portion of a metal mold used in the production of the tube shown in FIG. 2 and illustrating the function thereof.

Referring now to FIG. 3, there is shown a typical construction of metal mold by which the production method described above is practiced. This metal mold is adapted for the formation of the type of tube shown in FIG. 2 and consists of a core 31 and three sets of plugs 32, 32'; 33; and 34, 34'. The core consists of a cylindrical body having a maximum diameter equal to the inner diameter of the body section 4 of the tube to be molded. The core has a shoulder 31b, having a tapered surface corresponding to the shoulder 4a of the body, and a head 31a of a configuration same as that of the inner surface of the lid section 2, and is movable vertically. In the shoulder 31b of the core 31 is formed a cavity 23b corresponding to the inner wall 3b of the lid section. The plug 34, 34' is of split type and openable to the left and right respectively as viewed in the figure. This plug defines the configuration of that portion of the shoulder of the tube which is located below the flat surface of the shoulder 2b. The plug 32, 32' is also of split type and defines the configuration of that portion of the lid section which is located below the flat surface of the shoulder 2a and above the shoulder 2b of the lid section, or the configuration of the outer periphery of the head 2. The plug 33 is also of split type and is movable in a direction at right angles to said other plugs. This plug defines the configuration of the top end of the head and has a sprue runner 36 formed therein which is communicating with the aforementioned cavity, corresponding to the shoulder 2a, through a pin-point gate 35. All of the plugs are put together to form a cavity 21 corresponding to the inner and outer configurations of the lid section 1.

The metal mold described above is operated as follows. Namely, the plugs 32, 32' and 34, 34' are opened respectively in the respective directions of the arrows and the core 31 is moved in a downward direction. Then, the body section 4, having previously been formed by blow molding, is fitted on the core. Successively thereafter, the plugs are moved back in directions opposite to the directions of the respective arrows into a closed state shown in the figure, forming a desired cavity. A molten resin is injected into the cavity 21 from the sprue runner 36 through the gate 35. The molten resin is cooled to hard immediately by a cooling medium circulating through passages 37, and thus a lid section is formed consisting integrally of the head and the shoulder. In this case, the surface layer of that portion of the body section which comes in contact with the molten resin injected is molten by the latent heat of said resin, before said molten resin is solidified, whereby that portion of the body section 4 is rigidly melt bonded to and integrated with the outer and inner walls 3a and 3b of the shoulder 3 thus molded. Finally, each plug is opened again in the directions of the arrows to its original position and the completed tube is removed from the core 31. As will be appreciated, opening the pin-point gate in the cavity at a point in a plane corresponding to the shoulder 2a as described above is convenient because the flatness of the top end surface of the head 2 is not impaired by the removal of the gate stick. The figures to which reference was had in the foregoing description are of course diagrammatic views and in no way represent the actual mold. The mold shown in the figures diagrammatically will obviously be subjected to some design changes when it is to be put in practical use. Such design changes obviously include, for example, the provision of pusher pins in the core 31 along the axis thereof for easing the removal of the molded tube from said core and further formation of pressure fluid passages in said core for automatically blowing off the molded tube from said core upon completion of the molding. Moreover, a plurality of grooves 37, extending radially with respect to the axis of the core 31, may be formed in the shoulder of said core in communication with the cavity corresponding to the inner wall 3b, as indicated by the dotted lines. These grooves are useful for further smoothing the flow of the molten resin into the cavity.

FIG. 8 shows the critical portion of another embodiment of the metal mold which may be used for practicing the inventive method. This mold is designed to form a cap 88, which is to be connected to the side wall of the lid section by means of a strip 87, by injection molding simultaneously with the molding of the lid section of the tube. The tube molded with this metal mold will have the cap connected directly to the side wall of the lid section by an elongate strip, which cap is molded simultaneously with the molding of said lid section, and is, therefore, of practical advantage for the user in not losing the cap. A detailed explanation on this mold will be omitted because, as will be readily seen from both FIGS. 3 and 8, the only difference of this mold from that shown in FIG. 3 is that a slender channel is formed extending horizontally from the lower portion of the cavity, corresponding to the lid section, and communicating with a cavity of a configuration corresponding to the cap 88.

FIG. 7 shows the arrangement of a metal mold to be used for molding the tube of the type shown in FIG. 6. With this metal mold, alike in the preceding embodiments, a molten resin is injected into the cavity with pressure through a pin-point gate 74 which is opened in the cavity at a point on a plane corresponding to the shoulder 63c immediately below the top end surface of the head for the same reason as mentioned in the preceding description with reference to FIG. 3. In carrying out molding with this metal mold, it is necessary that the space between the outer surface of the shoulder 61b of the inner tube 61 and the inner surface of the shoulder 62b of the outer tube 62 is not larger than minimum or, in other words, both of the inner and outer tube are in as intimate contact with each other as possible at their shoulders. Because otherwise the molten resin is permitted to uselessly flow into said interspace and only an insufficient amount of the molten resin is distributed onto the shoulder of the outer tube. The outer tube preferably does not shield the outer surface of the shoulder of the inner tube entirely as shown in the figure. This is for the purpose of increasing the contact area between the outer wall of the shoulder of the tube and the inner tube and thereby increasing rigidity in the connection between the lid section and the inner tube of the body section. In this metal mold, a core 71 is formed in its shoulder an annular recess 72, wherein are further formed a plurality of grooves 73 arranged radially with respect to the axis of the core. These recesses and grooves together from a cavity corresponding to the inner wall 63b' of the lid section. As described previously, the grooves 73 facilitate the flow of the molten resin in the cavity and form ridges on the molded inner wall 63b' which serve as reinforcements for said inner wall.

Although the present invention has been described and illustrated in terms of particular embodiments thereof, it should be understood that this is by way of illustration only and the invention is not limited thereto.

I claim:

1. A method of producing a plastic tube, comprising inserting a core into the hollow of a tubular body molded of a thermoplastic resin and including at least a portion of a shoulder of the tube, said core having an outer configuration corresponding to the inner configuration of the tube and particularly to the inner configuration of a lid section of the tube; closing the exterior of said core with plugs having an inner configuration corresponding to the outer configuration of the lid section of the tube; positioning at least the upper portion of a shoulder of said tubular body within the cavity defined by the inner surfaces of said plugs and the outer surface of said core in spaced relation to said surfaces; and injecting into said cavity a molten thermoplastic resin of the same quality as that of said thermoplastic resin to thereby mold the lid section of the tube and simultaneously fix the upper portion of the shoulder of said tubular body in a double-walled shoulder of the lid section integrally therewith.

2. A method of producing a composite plastic tube comprising inserting a core into the hollow of a double-walled tubular body consisting of an inner tube molded of a thermoplastic resin and including at least a portion of a shoulder of the tube and a thin-walled outer tube molded of a plastic metal and enclosing said inner tube up to a point below the upper edge of said inner tube, said core having an outer configuration corresponding to the inner configuration of a lid section of the tube; closing the exterior of said core with plugs having an inner configuration corresponding to the outer configuration of the lid section of the tube; positioning at least the upper portion of shoulders of said outer and inner tubes within the cavity defined by the inner surfaces of said plugs and the outer surface of said core in spaced relation to said surfaces; and injecting into said cavity a molten thermoplastic resin of the same quality as that of said thermoplastic resin of which the inner tube is molded, to thereby mold the lid section of the tube and simultaneously fixing the upper portions of said inner and outer tubes in a double-walled shoulder of the lid section integrally therewith.

3. A method of producing a plastic tube according to claim 1, wherein plugs forming a cavity of a configuration corresponding to the inner and outer configuration of a cap are used, said cavity being in communication with the cavity for molding the lid section of the tube through an elongate channel.

4. The method produced according to the method of claim 1, wherein a shoulder is formed peripherally of the top surface of an opening of the tube.

5. A method of producing a plastic tube according to claim 1, wherein the inner surface of the plug defining the top surface of the head is projected peripherally of the opening to a plane perpendicular to the axis of the tube so as to form a shoulder in said top surface and a pouring gate is opened into the cavity at a point located on the surface of said projected portion of the plug.

6. A method of producing a plastic tube according to claim 1, wherein a plurality of grooves arranged radially with respect to the axis of the tube are formed in an annular recess in the shoulder of said core, which annular recess corresponds to the inner wall of the lid section of the tube.

7. A method of producing a plastic tube according to claim 2, wherein said thin-walled plastic metal-made outer tube has relieved on its shoulder a plurality of ridges arranged radially with respect to the axis of the tube.

8. A method of producing a plastic tube according to claim 2, wherein plugs forming a cavity of a configuration corresponding to the inner and outer configuration of a cap are used, said cavity being in communication with the cavity for molding the lid section of the tube through an elongate channel.

9. The method produced according to the method of claim 3, wherein a shoulder is formed peripherally of the top surface of an opening of the tube.

10. A method of producing a plastic tube according to claim 2, wherein the inner surface of the plug defining the top surface of the head is projected peripherally of the opening to a plane perpendicular to the axis of the tube so as to form a shoulder in said top surface and a pouring gate is opened into the cavity at a point located on the surface of said projected portion of the plug.

11. A method of producing a plastic tube according to claim 3, wherein the inner surface of the plug defining the top surface of the head is projected peripherally of the opening to a plane perpendicular to the axis of the tube so as to form a shoulder in said top surface and a pouring gate is opened into the cavity at a point located on the surface of said projected portion of the plug.

12. A method of producing a plastic tube according to claim 1, wherein a plurality of grooves arranged radially with respect to the axis of the tube are formed in an annular recess in the shoulder of said core, which annular recess corresponds to the inner wall of the lid section of the tube.

13. A method of producing a plastic tube according to claim 3, wherein a plurality of grooves arranged radially with respect to the axis of the tube are formed in an annular recess in the shoulder of said core, which annular recess corresponds to the inner wall of the lid section of the tube.

14. A method of producing a plastic tube according to claim 5, wherein a plurality of grooves arranged radially with respect to the axis of the tube are formed in an annular recess in the shoulder of said core, which annular recess corresponds to the inner wall of the lid section of the tube.

15. A method of producing a plastic tube according to claim 3, wherein said thin-walled plastic metal-made outer tube has relieved on its shoulder a plurality of ridges arranged radially with respect to the axis of the tube.

16. A method of producing a plastic tube according to claim 5, wherein said thin-walled plastic metal-made outer tube has relieved on its shoulder a plurality of ridges arranged radially with respect to the axis of the tube.

17. A method of producing a plastic tube according to claim 6, wherein said thin-walled plastic metal-made outer tube has relieved on its shoulder a plurality of ridges arranged radially with respect to the axis of the tube.

References Cited

UNITED STATES PATENTS

| | | | |
|---|---|---|---|
| 2,911,128 | 11/1959 | Krautkramer | 222—543 |
| 3,001,673 | 9/1961 | Brown | 222—107 |
| 3,356,263 | 12/1967 | Monroe | 222—107 |

ROBERT B. REEVES, Primary Examiner

H. S. LANE, Assistant Examiner

U.S. Cl. X.R.

156—242